US008080759B2

(12) United States Patent
Belaschenko

(10) Patent No.: US 8,080,759 B2

(45) Date of Patent: Dec. 20, 2011

(54) MULTI-ELECTRODE PLASMA SYSTEM AND METHOD FOR THERMAL SPRAYING

(76) Inventor: Vladimir E. Belaschenko, Concord, NH (US)

( * ) Notice: Subject to any disclaimer, the term of this patent is extended or adjusted under 35 U.S.C. 154(b) by 31 days.

(21) Appl. No.: 12/831,003

(22) Filed: Jul. 6, 2010

(65) Prior Publication Data

US 2011/0000895 A1 Jan. 6, 2011

Related U.S. Application Data

(63) Continuation of application No. 10/997,800, filed on Nov. 24, 2004, now Pat. No. 7,750,265.

(51) Int. Cl.
*B23K 10/00* (2006.01)

(52) U.S. Cl. ........... 219/121.47; 219/121.36; 219/121.5; 219/121.52; 219/121.56; 219/121.57

(58) Field of Classification Search ............. 219/121.51, 219/121.52, 75, 121.48, 121.54, 121.55, 219/121.56, 121.57, 121.47
See application file for complete search history.

(56) References Cited

U.S. PATENT DOCUMENTS

| | | | |
|---|---|---|---|
| 3,583,633 | A | 6/1971 | Campargue |
| 4,916,273 | A | 4/1990 | Browning |
| 5,014,915 | A | 5/1991 | Simm et al. |
| 5,122,182 | A | 6/1992 | Dorfman et al. |
| 5,243,169 | A | 9/1993 | Tateno et al. |
| 5,834,066 | A | 11/1998 | Kunzli et al. |
| 5,932,293 | A | 8/1999 | Belashchenko |
| 6,003,788 | A | 12/1999 | Sedov |
| 7,067,170 | B2 | 6/2006 | Marcus et al. |
| 7,608,797 | B2 | 10/2009 | Belashchenko |
| 2005/0255419 | A1 | 11/2005 | Belashchenko et al. |
| 2006/0037533 | A1 | 2/2006 | Belashchenko et al. |
| 2006/0108332 | A1 | 5/2006 | Belashchenko |

FOREIGN PATENT DOCUMENTS

| | | | |
|---|---|---|---|
| RU | 2026118 | C1 | 5/1993 |
| RU | 2037336 | C1 | 6/1995 |
| RU | 2056231 | C1 | 3/1996 |

OTHER PUBLICATIONS

International Search Report and Written Opinion issued on Feb. 23, 2007 in International Application No. PCT/US2005/022100.
Notice of Allowance Dated Jun. 25, 2009 issued in related U.S. Appl. No. 11/158,314.
U.S. Office Action Dated May 21, 2008 issued in related U.S. Appl. No. 11/158,314.
Interview Summary Dated Jan. 31, 2008 issued in related U.S. Appl. No. 11/158,314.
U.S. Office Action dated Aug. 31, 2007 issued in related U.S. Appl. No. 11/158,314.
U.S. Office Action dated Mar. 15, 2007 issued in related U.S. Appl. No. 11/158,314.

*Primary Examiner* — Mark Paschall
(74) *Attorney, Agent, or Firm* — Grossman, Tucker, Perreault & Pfleger, PLLC

(57) ABSTRACT

A plasma apparatus is provided including a cathode module, an anode module, and at least one inter-electrode insert located between the cathode module and the anode module. The cathode module includes at least one cathode, and a pilot module may be provided adjacent to the cathode module. The pilot module may assist ignition of the plasma apparatus. The inter-electrode insert may have an upstream and a downstream transverse surface. Both the upstream transverse surface and the downstream transverse surface are angled in a downstream direction.

20 Claims, 14 Drawing Sheets

MULTI-ELECTRODE PLASMA SYSTEM AND METHOD FOR THERMAL SPRAYING

CROSS REFERENCE TO RELATED APPLICATIONS

This application is a Continuation of U.S. application Ser. No. 10/997,800 filed on Nov. 24, 2004, now U.S. Pat. No. 7,750,265 issued on Jul. 6, 2010, entitled "Plasma System and Apparatus," of which is incorporated by reference.

FIELD

The present disclosure generally relates to plasma systems and plasma torches, and spray coating systems and spray coating apparatus utilizing plasma systems.

BACKGROUND

High velocity spraying processes based on combustion of oxygen-fuel mixtures (HVOF), air-fuel mixtures (HVAF), and/or plasma jets allow coatings to be sprayed from variety of materials. Such processes may generally produce high velocity gas or plasma jets. High quality coatings can be sprayed at a high level of efficiency when the temperature of the jet is high enough to soften or melt the particles being sprayed and the velocity of the stream of combustion products is high enough to provide the required density and other coating properties. Different materials require different optimum temperatures of the sprayed particles in order to provide an efficient formation of high quality coatings. Higher melting point materials, such as cobalt and/or nickel based alloys, carbides and composite materials, may often require relatively high temperatures in order to soften the particles to a level sufficient to efficiently form high quality coatings.

The efficiency of plasma thermal spray systems, and of coating produced using plasma thermal spray systems, may be effected by a variety of parameters. Properly establishing a plasma jet and maintaining the operating parameters of the plasma jet may, for example, be influenced by the ability to form a stable arc having a consistent attachment to the anode. Similarly, the stability of the arc may also be a function of erosion of the anode and/or erosion of plasma jet profiling or forming unit. Erosion of the anode and/or of the forming unit may change the profile of the plasma cavity. Changes of the interior profile of the plasma cavity may result in changes in the characteristics of the plasma jet produced by the plasma torch. Additionally, the quality of a coating produced by a plasma spray system may be affected by consequential heating of the substrate being coated. For example, excessive heating of the substrate may result in diminished coating characteristics.

BRIEF DESCRIPTION OF THE DRAWINGS

Features and advantages of the claimed subject matter will be apparent from the following description of embodiments consistent therewith, which description should be considered in conjunction with the accompanying drawings, wherein:

DESCRIPTION

As a general overview, the present disclosure may provide modules and elements of a cascade plasma system, and/or a cascade plasma spray system and apparatus, that may exhibit one or more of; relatively wide operational window of plasma parameters, more stable and/or uniform plasma jet, longer electrode life, and longer neutral insert life. Additionally, the present disclosure may provide tools and/or control systems that may control a spray pattern and/or a substrate temperature. Control of a spray pattern and/or control of a substrate temperature may provide a decrease in the occurrence and/or magnitude of defects in a coating sprayed onto the substrate.

Figure 1:
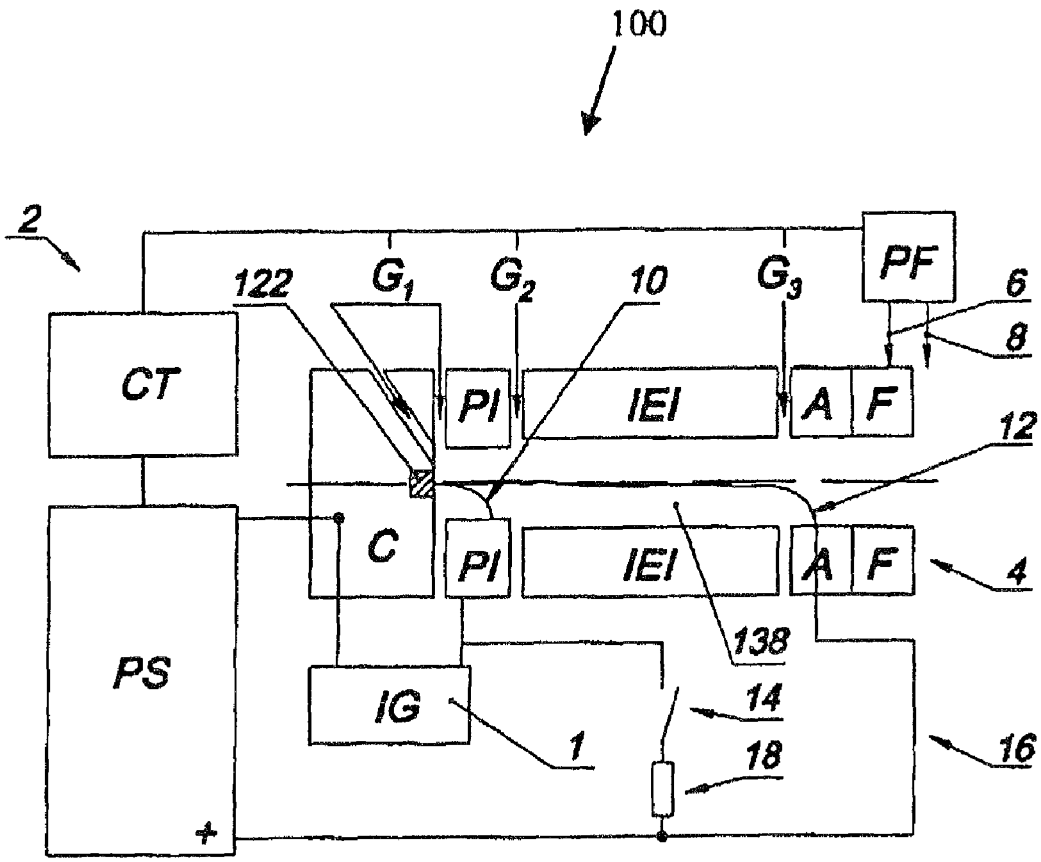
FIG. 1 is a schematic illustration of an embodiment of a plasma system and/or plasma cascade plasma torch.

Referring first to FIG. 1, the present disclosure may generally provide a plasma system (PSY) 100 which may generally be based on a cascade plasma torch (CPT). The plasma system 100 may be, at least conceptually, considered to include a variety of modules. The plasma system 100 schematically depicted in FIG. 1 may include a DC power source module (PS); control module (CT), which may control the plasma electrical parameters, plasma gases flow rates; sequence of events, etc.; plasma ignition module (IG) and ignition circuit 16. The plasma system 100 may also include a plasma torch 4. The plasma torch 4, itself, may include a cathode module C having at least one cathode 122, a pilot insert module (PI), at least one inter-electrode insert module (IEI), and an anode module (A). A forming module (F) may be located downstream of anode arc root for shaping and/or controlling the velocity profile of a plasma stream exiting the region of the anode arc root. A powder feeding module (PF) feeding powder or powder suspension module may be provided for introducing a coating powder into a stream of plasma generated by the plasma torch 4.

The anode module A may include one or more features and/or arrangements of features that may stabilize the anode arc root position. In one embodiment, the anode arc root position may be stabilized by step in the plasma passage. In such an embodiment the expansion of the plasma jet through the stepped region of the anode results in favorable conditions for arc attachment downstream of the step and stability of arc length and related voltage. In another embodiment, the anode arc root may be stabilized using a plurality of ring members that are separated by annular grooves, thereby causing the arc root attachment.

The anode may be provided having different plasma passage profiles and/or may also serve as a forming module of the plasma device. In the latter case, the forming module may not necessarily be provided as a separate and/or distinct feature form anode module A. Erosion of the anode may result in changes of the dimensions and/or geometry of the anode plasma passage. Such changes in the dimensions and/or geometry of the anode plasma passage may result in related changes of the plasma parameters. According to an embodiment herein, a forming module of the plasma device may be provided that is electrically insulated from the anode. Electrically isolating the forming module from the anode may have an advantageous effect on the stability of parameters of a plasma jet exiting the forming module, by reducing the impact of anode erosion on the dimensions of the plasma passage. The forming module may be also be angled, which may provide the possibility of spraying on internal surface of pipes and inside other confined spaces.

A plasma gas G1 may be supplied to the cathode area, e.g., a space formed between the cathode 122 and pilot insert PI, through a passage inside the cathode module C, or through a passage formed by cathode module C and pilot insert PI. The plasma gas G1 may be the only gas used to generate plasma. According to other embodiments, however, a second plasma gas G2 may also be used to generate plasma. The second plasma gas G2 may be supplied through a passage between the pilot insert PI and the adjacent inter-electrode insert of the inter-electrode inserts module IEI. Alternatively, the passage for supplying the second plasma gas G2 may be formed in one of the pilot insert PI and/or an inter-electrode insert. A third plasma gas G3 may also be used to generate the plasma. The third plasma gas G3 may be supplied through a passage located adjacent the anode module A. According to one embodiment, the third plasma gas G3 may be supplied through a passed between the anode module A and an adjacent inter-electrode insert of the inter-electrode inserts module IEI. Still further plasma gasses may also be used to form the plasma. Such additional plasma gases may be supplied through passages (not shown) formed in and/or between inter-electrode inserts. The additional plasma gases may, in some instances, decrease arcing between the pilot insert PI and inter-electrode insert module IEI and/or between the inter-electrode insert module IEI and the anode module A. The additional plasma gases may, in some embodiments, reduce and/or minimize erosion of electrodes, control plasma composition, etc., in addition, or as an alternative, to decreasing arcing between the various modules.

The cathode 122 may be connected to a negative terminal of a DC power source PS. In one embodiment, the DC power source PS may produce low ripple current, which may increase the stability of plasma parameters. A very low ripple may be achieved, for example, by using a ripple cancellation technique. An example may be DC power source ESP-600C manufactured by ESAB. During plasma ignition the positive terminal of the power source may be connected to the pilot insert PI through the ignition circuit 16.

According to an embodiment here, the ignition circuit 16 may include the ignition module IG, resistor 18, switch 14, control elements, capacitors, choke, and inductors (not shown). The ignition module IG may have a high voltage, high frequency oscillator. The oscillator may initiate a pilot electrical arc 10 between the cathode 122 and the pilot insert PI. The DC power source PS may be employed to support the pilot arc 10. The pilot arc 10 may ionize at least a portion of the gases in a passage between cathode 122 and anode module A. The low resistance path formed by ionized gas may allow initiation of a main arc 12 between cathode 122 and anode module A. The switch 14 may be disengaged after the main arc 12 has been established, thus interrupting the pilot arc 10. Consistent with one embodiment, several switches may be connected to inter-electrode inserts to generate arcs between the cathode 122 and the inter-electrode inserts connected to the switches. Similar to the pilot arc 10, the arcs between the cathode 122 and the inter-electrode inserts may provide a low resistance path to facilitate initiation of the main arc 12, in the event that the length of the main arc 12 is greater than the capability of the ignition circuit utilizing only pilot insert PI.

The plasma torch 4 may be capable of using a high-voltage, low current approach, which may suitably be used with a wide range of plasma gas flow rates and/or related Reynolds's numbers. Such a cascade plasma gun may be capable of realizing laminar, transition, and turbulent plasma jet flows. The principles of such a cascade plasma torch are described and schematically illustrated in more details in FIG. 2.

Figure 2:
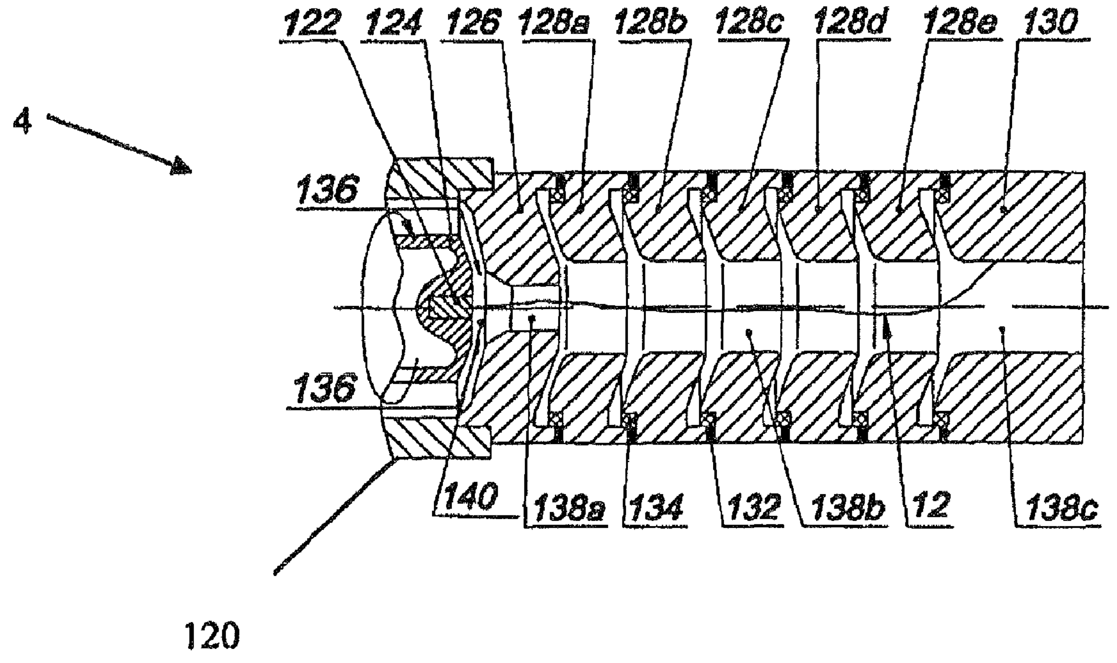
FIG. 2 is a schematic view of an embodiment of plasma system with a plasma gas supplied to the cathode area.

Referring to FIG. 2, an embodiment of a cascade plasma torch 4 may include a cathode module 120, which may include at least one cathode 122 mounted in a cathode holder 124. The plasma torch 4 may also include an anode module 130, a pilot insert 126 and intermediate module having at least one inter-electrode insert (IEI) 128 that may be electrically insulated from cathode 122 and electrically insulated from the anode module 130. In one embodiment, electrical insulation of the inter-electrode insert 128 from the cathode 122 and from the anode module 130 may be achieved by providing high temperature sealing plastic O-rings 132 and by rings 134 made from electrically insulating material, such as ceramic. Various other additional and/or alternative means may be employed for electrically insulating the cathode 122 and the inter-electrode insert 128.

The inter-electrode inserts 128 may generally be spacers that may provide a desired separation between the anode 130 and cathode 122. Additionally, the inter-electrode inserts 128 may define the length and the internal geometry and/or profile of the plasma chamber. Accordingly, the number of inter-electrode inserts 128 employed in a specific plasma torch 4 may depend, at least in part, on the desired operating voltage and arc length. In the illustrated embodiment of FIG. 2, five inter-electrode inserts 128 are shown, which may provide the plasma torch with an operating voltage in the general range of between about 160-260 V. A greater number of inter-electrode inserts 128 may be included if a higher operating voltage is to be employed. The inter-electrode inserts 128 in the illustrated embodiment are also shown having an annular geometry with all of the inter-electrode inserts 128 generally having the same inside diameter. Other embodiments consistent with the present disclosure may include one or more inter-electrode-inserts having a non-annular geometry. Similarly, embodiments consistent with the present disclosure may include one or more inter-electrode inserts having an inside diameter that is different from one or more other inter-electrode inserts. The cascade plasma torch 4 may have a passage that may be connected to a pressure sensor (not shown). The pressure sensor may be provided as part of a feedback circuit that may be used to control the pressure in the plasma channel.

The ratio between a diameter of the pilot insert and diameter of the adjacent inter-electrode insert may effect stable and/or repeatable ignition of the plasma torch 4. Experimental testing indicates that reliable ignition may occur when diameter Dp of the pilot insert 126 is less than diameter Dc of the inter-electrode insert 128*a*.

Figure 3:
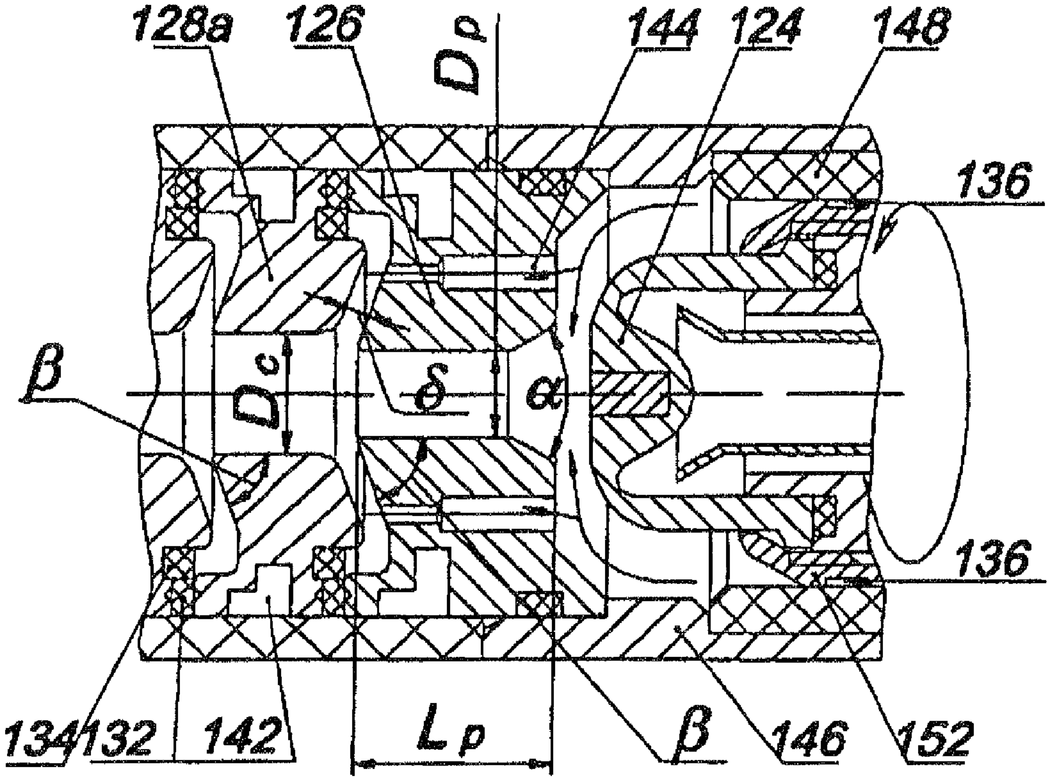
FIG. 3 illustrates an embodiment of a portion of a plasma system consistent with the present disclosure, including a cathode module, a pilot insert, and a first inter-electrode insert.

An embodiment of a cathode module 148, pilot insert 126, and a first inter-electrode insert 128*a* are shown in detail in FIG. 3. Consistent with the illustrated embodiment, the ratio between Dp and Dc may generally be:

$$0.85>Dp/Dc>0.5. \quad (1)$$

At the same time a difference between Dc and Dp may be greater than, or equal to, 1.5 mm:

$$Dc-Dp>1.5 \text{ mm}. \quad (2)$$

Both of these relationships may be considered in designing a plasma torch. For example, if Dc=5 mm, equation (1) gives Dp<4.2 mm. Additionally, considering equation (2) gives Dp<3.5 mm. In an embodiment complying with both of these equations, Dp=3.5 mm may be chosen as a maximum diameter of the pilot insert 126.

Reducing and/or minimizing disturbances of the plasma gas flow in a space 140 between cathode 122/cathode holder 124 and the pilot insert 126 as well as in the channel 138*a* inside the pilot insert may facilitate stabilizing the position of the arc root attachment to the pilot insert 126. Approaches for reducing and/or minimizing disturbances to the plasma gas flow are illustrated and described with reference to FIGS. 3 and 4*a-c*.

A first approach may include the use of a conical converging zone at the entrance of the pilot insert 126. The conical entrance may be characterized by an angle α which may be generally in the range of between about 40-80 degrees, inclusive. According to a particular embodiment, the angle α may generally be in the range of between about 50-70 degrees, inclusive. Thus the converging angle α/2 relative to the longitudinal axis of the plasma passage is in the range of about 25-35 degrees, inclusive. The conical entrance zone of the pilot insert 126 may have a length $\delta_1$ which may be described as $\delta_1$=(0.1-0.3) $L_p$, where $L_p$ is the length of pilot insert 126. Providing the length $L_p$ of the pilot insert 126 may be within $L_p$=(0.5-3)Dc may make it possible to avoid and/or decrease the occurrence of random arc root attachments to the pilot insert 126 when the main arc 12 is established and switch 14 is disengaged. The ratio between Lp and Dc may depend, at least in part, on the type of plasma gas. For example, Lp<Dc may be desirable if argon is used as a plasma gas.

Figure 4A:
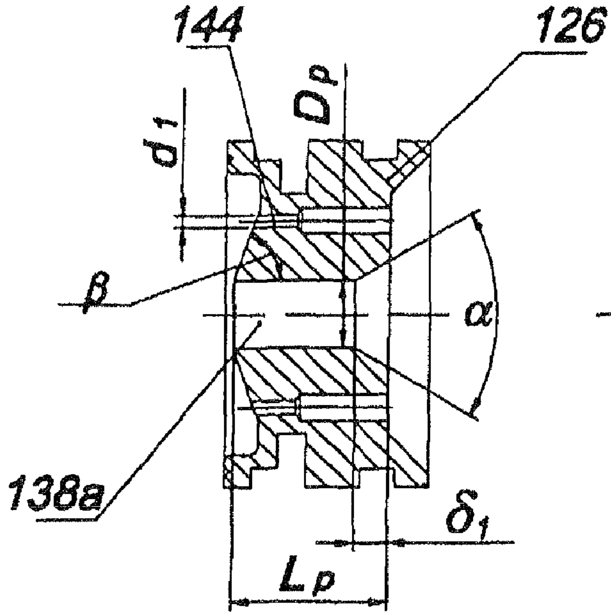
FIGS. 4*a-c* illustrate an embodiment of a pilot insert features and an inter-electrode insert in various views.
Figure 4B:
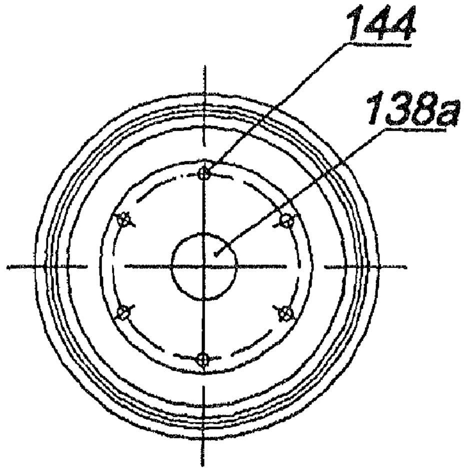
Figure 4C:
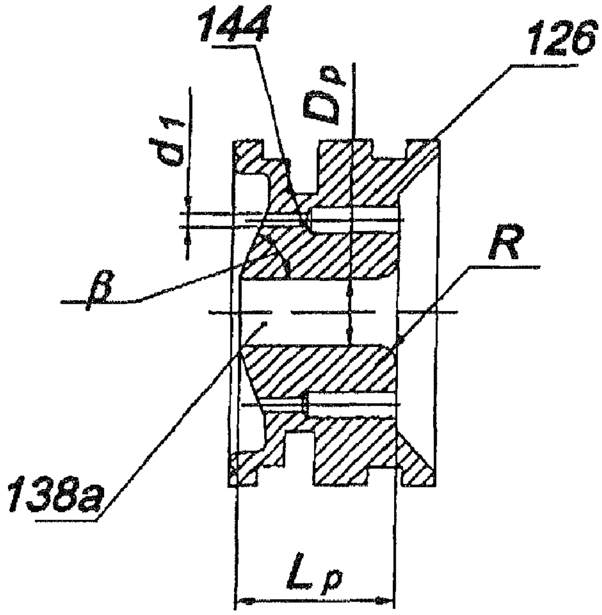
Figure 5:
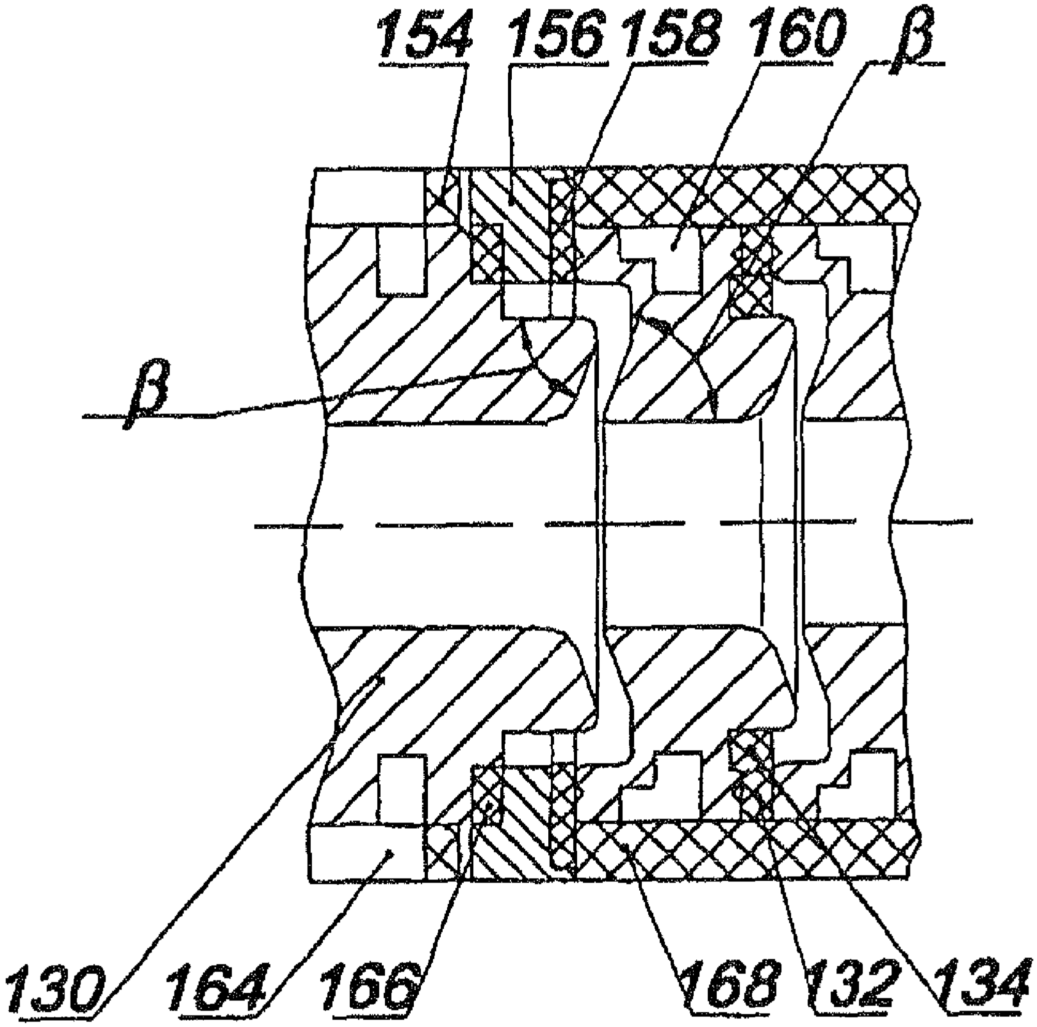
FIG. 5 schematically depicts a portion of an embodiment of a plasma system consistent with the present disclosure adjacent the anode.

A second approach to stabilizing the position of the arc root attachment to the pilot insert 126 is illustrated and described with reference to FIG. 4*c*. In the case of the illustrated embodiment, the entrance of the pilot insert 126 may have a rounded and/or smooth curvature. As shown, the entrance of the pilot insert 126 may be rounded having a radius R at the upstream end of the pilot insert. Radius R may be in the range R=(0.2-0.5)Dp. According to alternative embodiments, the entrance of the pilot insert 126 may have a multi-radius curvature and/or may include both linear and curved regions.

According to another aspect, the pilot insert 126 may include one or more bypass holes 144. According to such an embodiment, part of the plasma gas may be fed through the bypass holes 144 and into the space formed by the pilot insert 126 and the first inter-electrode insert 128*a*. Gas flow in this space may allow illuminating arcing between the pilot and the first inserts. In some embodiments, the bypass holes 144 may be evenly distributed on a circle with diameter Db>Dc. Furthermore, the use of six or more bypass holes 144 may allow a relatively homogeneous gas flow in the space. The total surface area of the bypass holes 144 may be within 0.2-0.8 of the surface area of the central passage inside the pilot insert 126. This aspect may be described by the relationship Sb=(0.2-0.8) $\pi Dp^2/4$. Bypass gas flow may, in some embodiments, also decrease swirl intensity of gas flowing through the plasma torch 4.

As mentioned above, the pilot insert 126, inter-electrode inserts 128 and anode 130 may be insulated from each other, for example, by high temperature plastic O-rings 132 and insulating rings 134 which may be made from ceramics. According to one aspect, it may be desirable to avoid an influence of direct radiation from the arc on the insulators between the inter-electrode inserts 128, such as the O-rings 132 and insulating rings 134. As shown, for example in FIGS. 2 through 5, in one embodiment the interface between the pilot insert 126, inter-electrode inserts 128, and the anode module 130 may be swept downstream.

Figure 13:
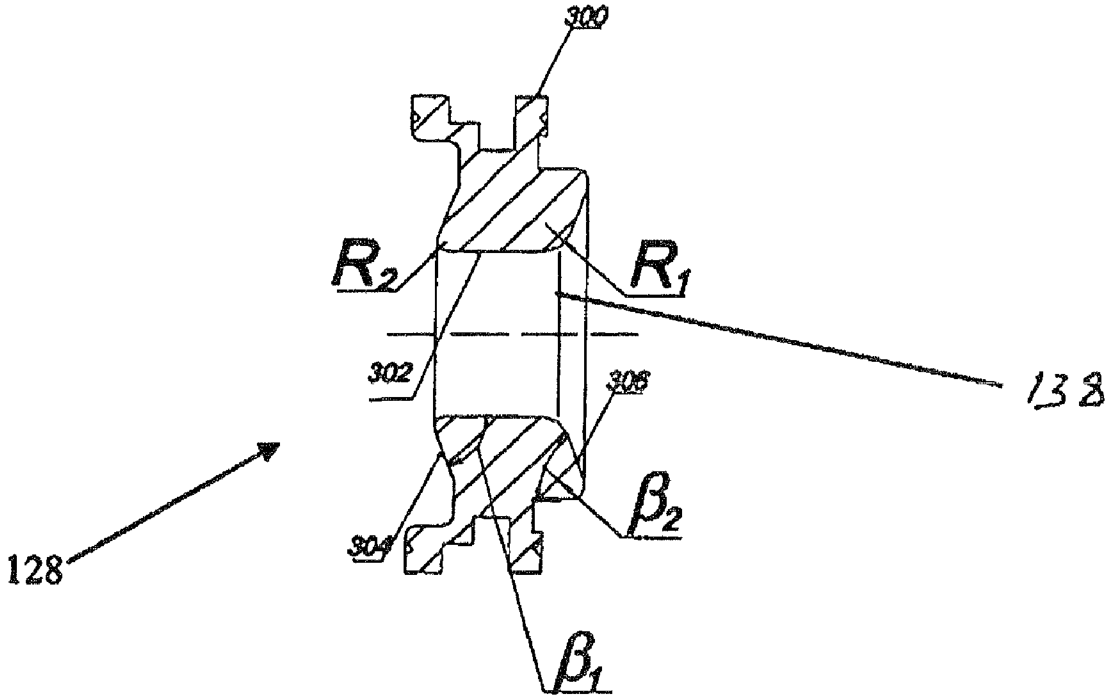
FIG. 13 is a cross-sectional schematic view of an embodiment of an inter-electrode insert consistent with the present disclosure.
Figure 14:
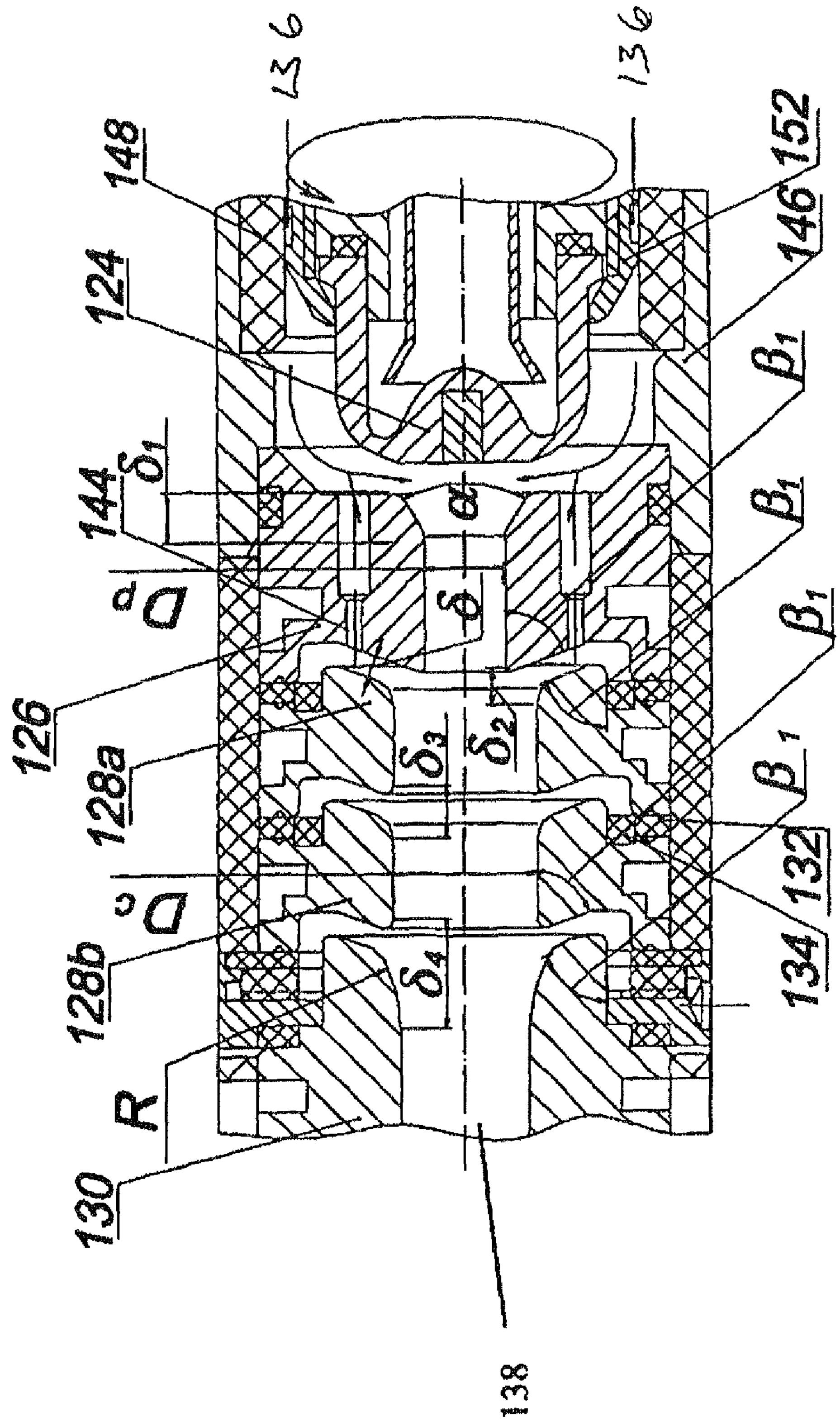
FIG. 14 is a cross-sectional schematic view of an embodiment of a portion of a plasma torch consistent with the present disclosure.

With additional reference to FIGS. 13 and 14, an inter-electrode insert 128 may generally have an annular geometry having at least four main surfaces. The first surface 302 may be an internal surface defining the plasma passage. According to an embodiment, the first surface 302 may have an axial symmetry about the axis of the plasma passage 138. The second surface 300 may be the outer surface. According to one embodiment, the outer surface 300 may also have an axial symmetry to the axis of the plasma passage 138. The inter-electrode insert 128 may also include transverse third 304 and fourth 306 surfaces of the inter-electrode insert 128 may respectively define the downstream and upstream sides of the inter-electrode insert 128. As illustrated the downstream transverse, or side, surface 304 and the upstream transverse, or side, surface 306 may be swept downstream, i.e., the transverse surfaces 304, 306 may be oriented non-perpendicularly relative to the axis of the plasma passage 138. In the illustrated embodiment, the downstream transverse surface 304 and upstream transverse surface 306 of the insert 128 may respectively be characterized by angles β1 and β2. Similarly, the pilot insert 126 may have a downstream surface that is similar to downstream surface 304 of the inter-electrode inserts 128. The anode 130 may have an upstream surface which is similar to 306.

Consistent with the present disclosure, the angle β1, describing the angle of the downstream surface 304 of the inter-electrode insert 128, may generally be in the range of between about 55-85 degrees relative to the axis of the plasma channel 138. In a particular embodiment consistent with the present disclosure, the angle β may generally be in the range of between about 65-75 degrees. In some extremes, a smaller angle may result in overheating of the downstream edges if the pilot insert 126 and inter-electrode inserts 128, and a larger angle may result in greater outside diameter of the pilot insert 126 and inter-electrode insert 128.

The angle $\beta_2$, describing the angle of the upstream surface 306, may generally be in the range of between about 55-85 degrees relative to the axis of the plasma channel 138. According to one particular embodiment herein, the angle $\beta_2$ may generally be between about 65-75 degrees relative to the axis of the plasma channel 138. While the angle $\beta_1$ of the downstream surface 304 may generally be in the same range as the angle $\beta_2$ of the upstream surface 306 of the inter-electrode insert 128, the two surfaces 304, 306 of an inter-electrode insert 128 may be at different angles than one another.

As illustrated, the upstream edge of the inter-electrode insert 128 may have a curved surface connecting side surface 306 with internal surface 302. The curvature may be characterized by radius R1. The radius R1 may generally be on the order of the diameter Dc of the plasma chamber or passage 138. Generally, the radius R1 may be in the generally range of R1=(0.5-1.5)Dc. Similarly, the downstream edge of the inter-electrode insert 128 may have a curved surface connecting the downstream surface 304 and the inner surface 302 of the inter-electrode insert 128. According to one embodiment, the curved surface of the downstream edge of the inter-electrode surface 128 may have a relatively small radius R2 on the order of between about 1-3 mm. Consistent with the present disclosure, one and/or both of the down stream edge and the upstream edge of the inter-electrode insert 128 may have a complex curve defined by more than one radius and/or linear expanse.

Figure 6A:
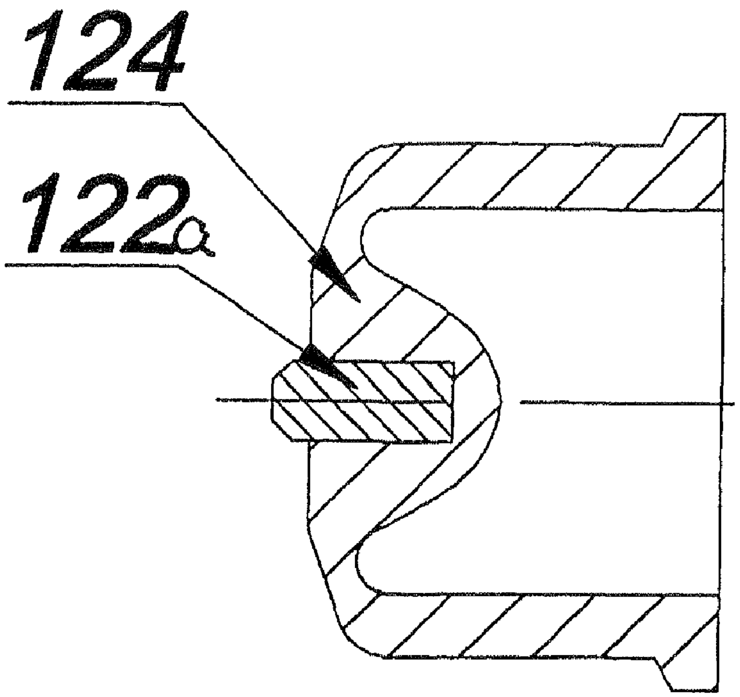
FIGS. 6*a-b* schematically depict, in cross-section, two embodiments of a cathode arrangement consistent with the present disclosure.
Figure 6B:
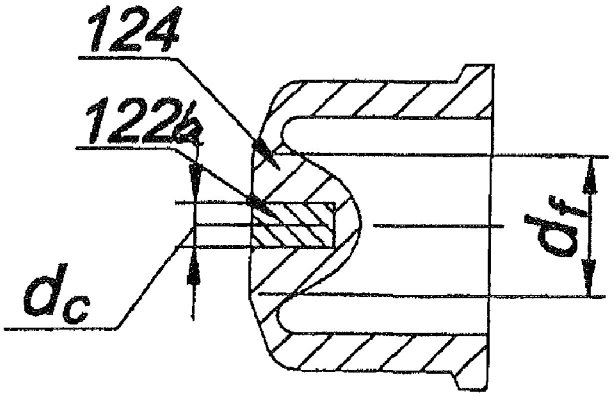

The cathode module C may be provided having a variety of different configurations. In a general sense, the cathode module may be provided having the cathode 122*a* protruding beyond the cathode holder 124, as shown in FIG. 6*a*. According to an alternative configuration, the cathode 122*b* may be configured flush with the cathode holder 124, as shown in FIG. 6*b*. The protruding cathode 122*a* may allow a plasma apparatus based on relatively low voltage to stabilize the position of the arc attachment. Minor fluctuations in the arc attachment may not significantly influence the stability of the arc 12 and/or the stability of related plasma parameters in a cascade plasma apparatus using a relatively high voltage.

A flush cathode 122*b* configuration may provide enhanced cooling conditions in comparison with the protruding cathode 122*a*. Enhanced cooling conditions may result in longer life of the cathode. The longer cathode life provided by the enhanced cooling of the flush cathode 122*b* may be useful in some cascade plasma apparatus designs. According to one embodiment, flush cathode 122*b* may be provided in which $Dp>d_c$ where $d_c$ is diameter of the cathode. The diameter of the cathode be related to the erosion experienced by the cathode, in which erosion may be related to maximum current $I_{max}$ to be used during cascade apparatus applications. Correlation between $d_c$ and $I_{max}$ may be described as $d_c=(0.7\text{-}1.3)I_{max}/100$, where cathode diameter is measured in millimeters and current is measured in amps. Based on this general relationship, the life of the cathode may be increased by operating the plasma apparatus with $I_{max}$ equal to, or less than, 300-500 A. Considering the relationship between maximum current and cathode diameter, for a plasma apparatus operating with a maximum current less than, or equal to 300-500 A, the cathode diameter may be in the range of 4±0.5 mm. According to such an embodiment, the cathode holder 124 may have a flat area, i.e., an area generally free of sharp angles, arcing, conical transitions, etc., surrounding cathode and diameter of the area is $D_h=(2\text{-}3)d_c$.

Figure 7:
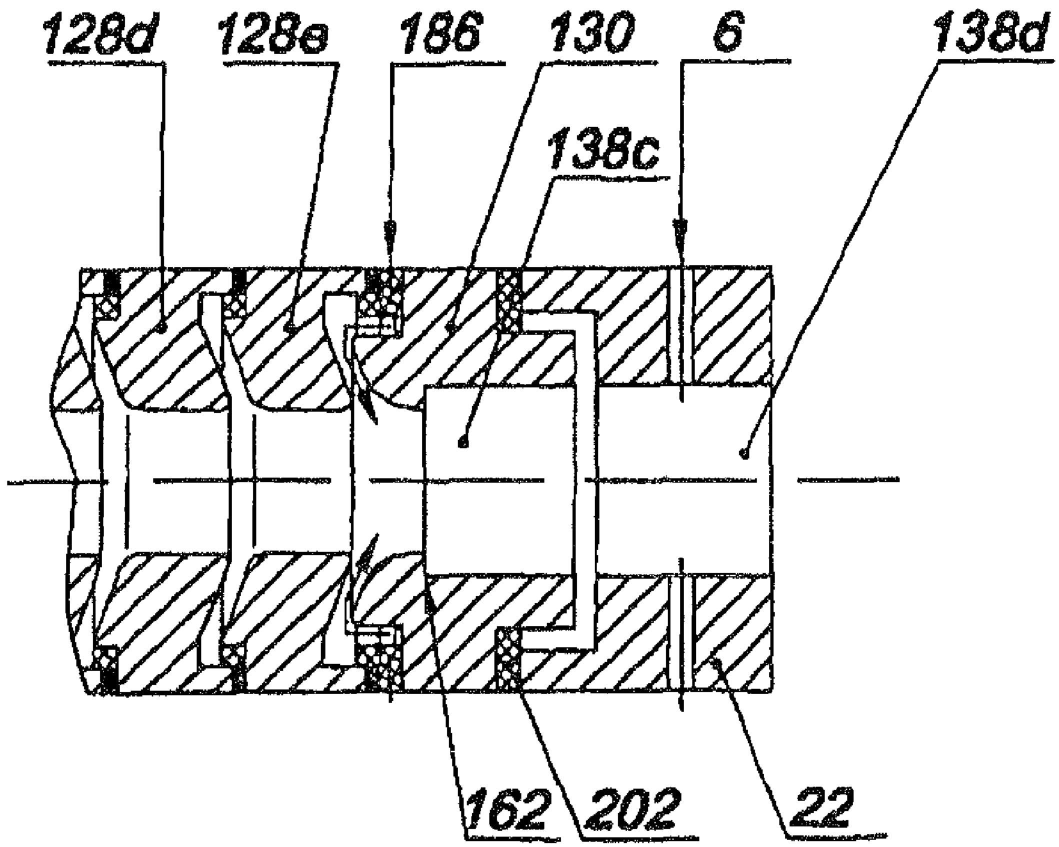
FIG. 7 is a cross-sectional schematic view of an embodiment of an anode portion of a plasma system consistent with the present disclosure.

The anode module 130 may include a means for stabilizing the anode arc root position. Referring to FIG. 7 an embodiment of a "stepped" anode 130 is illustrated. The stepped anode 130 may act to stabilize the arc root position downstream of the step 162. That is, the stepped anode module 130 may limit variations in the position where the arc contacts the anode. The anode 130 may be provided having different profiles. In some embodiments consistent with the present disclosure, the anode may also serve as a forming module of the plasma device. Erosion of the anode 130, however, may result in changes of the dimensions of the anode plasma passage. Such changes in the dimensions of the anode plasma passage may result in related changes of the plasma parameters. According to an embodiment herein, a forming module of the plasma device may be provided as a separate component from the anode 130, and the forming module may be electrically insulated from the anode 130. Electrically isolating the forming module from the anode 130 may have an advantageous effect on the stability of parameters of a plasma jet exiting the forming module, by reducing the impact of anode erosion on the dimensions of the plasma passage. An embodiment of an electrically insulated forming module 22 coupled to a "stepped" anode 130 is also illustrated by FIG. 7. Powder feeding in the illustrated embodiment may be done internally inside the forming module 22 using powder passages 6.

Figure 8:
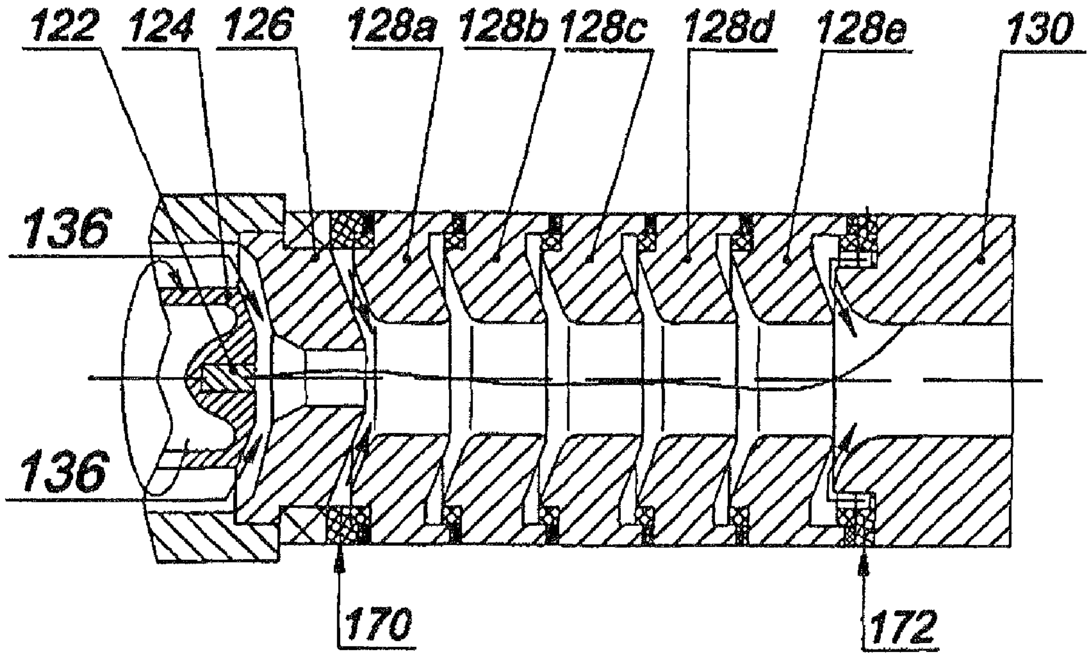
FIG. 8 is a cross-sectional schematic view of an embodiment of a plasma system consistent with the present disclosure.

As discussed with reference to FIG. 2, a plasma apparatus herein may be provided having one plasma gas. As discussed generally with reference to FIG. 1, however, additional plasma gases and related systems for supplying such additional plasma gases are also considered in the present disclosure. FIG. 8 illustrates an embodiment of a plasma apparatus utilizing additional plasma gases. Consistent with the illustrated embodiment, a first plasma gas may be supplied through a passage 136 and into a space between cathode 122/cathode holder 124 and the pilot insert 126. A profile of plasma passage 136 may provide a swirl of the first plasma gas which may, in some embodiments, provide an improved stability of the cathode arc attachment. A second plasma gas may be supplied to the plasma channel through a passage 170 located between the pilot insert 126 and the first inter-electrode insert 128*a*. In one such embodiment, the flow rate of the second plasma gas may be greater than the flow rate of the first plasma gas. Consistent with one particular embodiment, under operating conditions, after the main arc has been initiated, the second flow rate may be around 5-10 times greater than the first flow rate.

The first and second plasma gases may be, for example, argon, hydrogen, nitrogen, air, helium or their mixtures. Other gases may also suitably be used. Consistent with one embodiment, the first plasma gas may be argon. The argon first plasma gas may shield the cathode 122. Shielding the cathode 122 with the first plasma gas may extend the life of the cathode 122. Similarly, the anode 130 may be protected by anode shielding gas that may be supplied through a passage 172 adjacent the anode 130 and into anode plasma passage. The anode shielding gas may be, for example, argon or a hydrocarbon gas like natural gas. According to one embodiment, the anode shielding gas may result in a diffusion of the anode arc root which, consequently, may increase life of the anode.

Figure 9A:
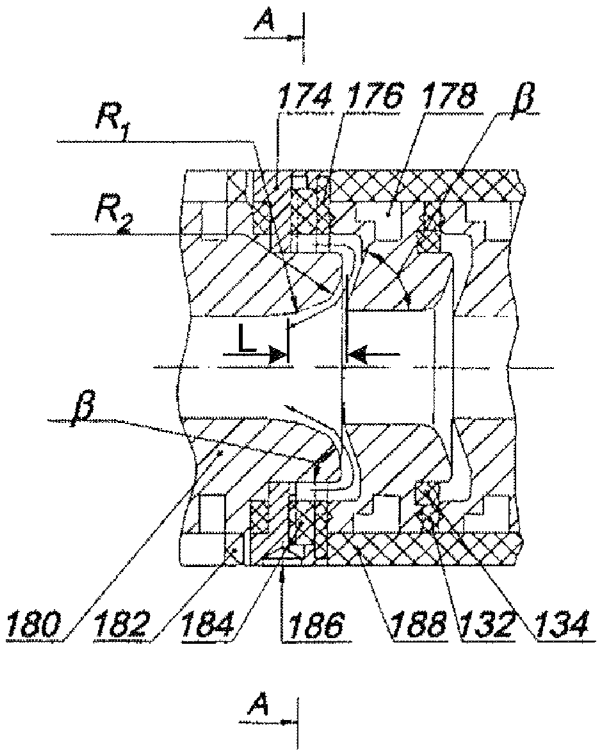
FIGS. 9*a-b* illustrate a cross-sectional view and a sectional view of an embodiment of a step anode and forming module, which may be used in connection with a plasma system consistent with the present disclosure.
Figure 9B:
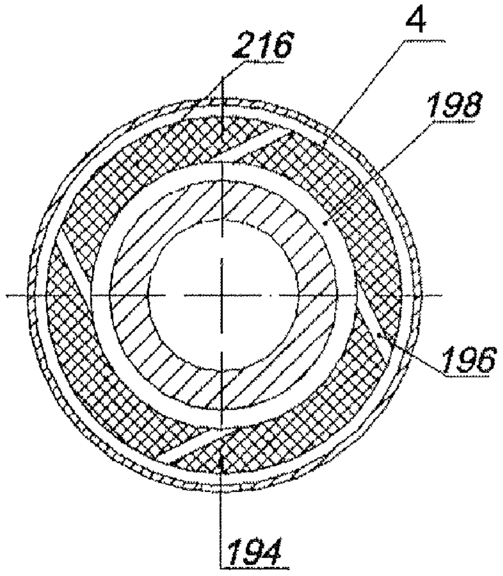

Application of the anode shielding gas may be facilitated by a specific profile of upstream portion of the anode 130. With reference to FIGS. 9*a-b*, a smooth transition may provide less disturbance of plasma by the anode shielding gas. The smooth transition may be multi-radiused R1, R2 over the length L of the transition. This effect may be especially desirable in embodiments having a plasma flow with low Reynolds number, which may enhance the stability of a laminar or transition plasma flows. Radii R1, R2 and the transition length L may be of the order of the anode plasma channel diameter. However, R1, R2, and L may additionally, or alternatively, depend on the anode shielding gas flow rate.

In one embodiment consistent with the present disclosure, the second plasma gas and the anode shielding gas may be supplied having a swirl pattern. Turning to FIG. 9*b*, a distribution element (ring) 216 may be provided having passages 196 that may introduce the gas at an angle to the radius of the passage. The angular introduction of the gas may create a swirl component for anode shielding gas. Similar distribution ring may be used to feed the secondary gas 170.

Any, or all, of the amount of a second plasma gas and/or of an anode shielding gas, the cross-section and number of passages 196, as well as the position and/or angle of the passages 196 relative to the space 198 may influence the plasma temperature and/or velocity distribution across the plasma jet. Accordingly, these aspects may be varied to achieve desired plasma jet parameters. Control of the plasma temperature and velocity distribution may also influence a spray pattern achieved using a particular number and positions of powder injectors. The spray pattern may also be influenced by the flow rate, and velocity of the carrier gas through the powder injectors.

Figure 10:
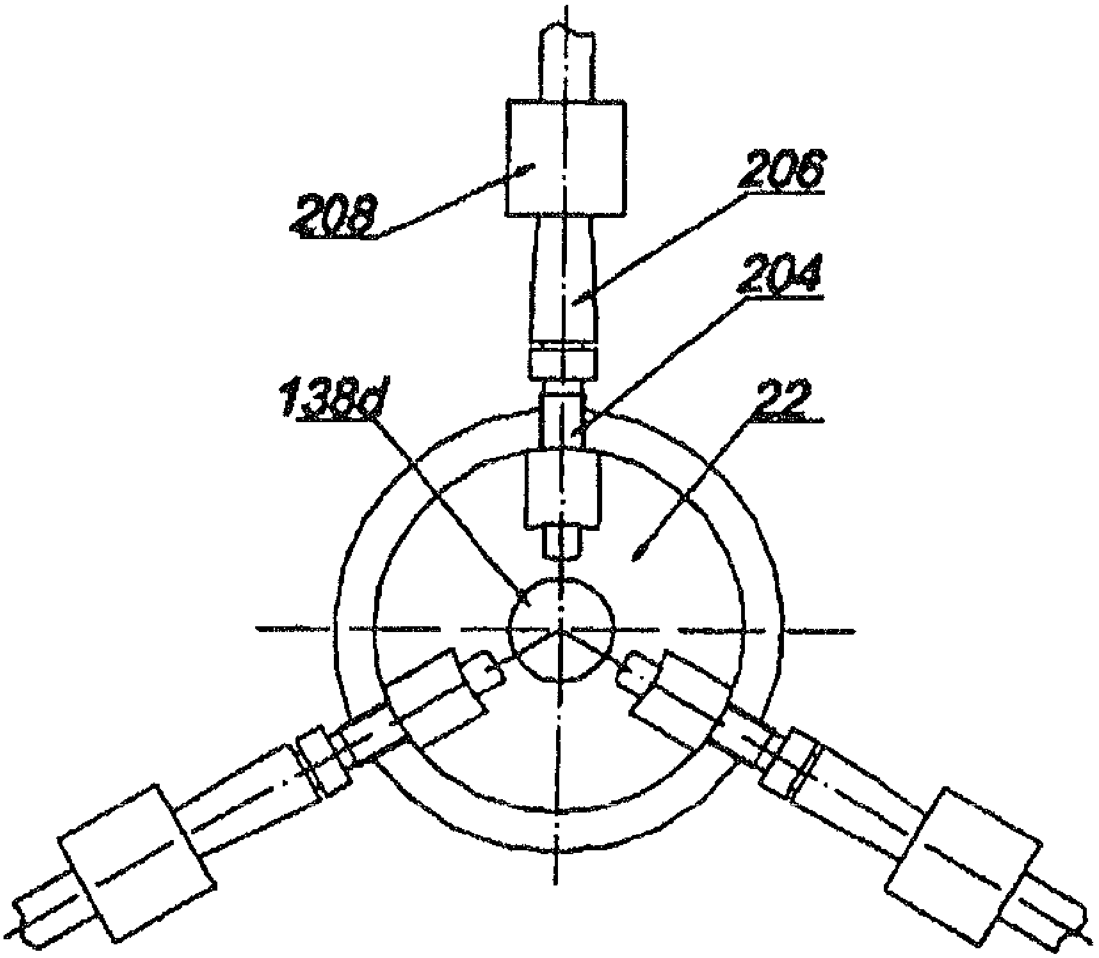
FIG. 10 schematically illustrates an embodiment of a powder injection configuration that may be used in connection with a plasma system consistent with the present disclosure.

Referring to FIG. 10, an embodiment of a powder injector array that may be used for introducing powder into a plasma stream is shown. Consistent with the illustrated embodiment, powder to be sprayed using the plasma may be supplied through a powder feed line 206 to a powder injector 204. The powder may be introduced into the plasma jet exiting from the channel 138*d* by the powder injector 204. In the illustrated embodiment, three powder injectors 204 are depicted. The number and relative placement of the powder injectors 204 may, however, by varied according to a given application.

According to one aspect, each powder feed line 206 may include a quick switch valve 208 that may open and/or close an orifice inside the powder feed line 206, thereby controlling the flow of powder through the feed line 206 to the injector 204. The powder feed quick switch valve 208 may be of a commercially available variety, such as those manufactured by Sulzer Metco, Wesbury, N.Y., USA. The quick switch valves 208 may be used to control the spray pattern achieved by a plasma spray coating apparatus. Furthermore, at least one of the powder injectors may supply a different material than at least one other injector. Thus, the quick switch valves 208 may control the composition of the coating by controlling and/or varying the relative quantities of each of the different materials being introduced into the plasma jet exiting the channel 138*d*.

Figure 12A:
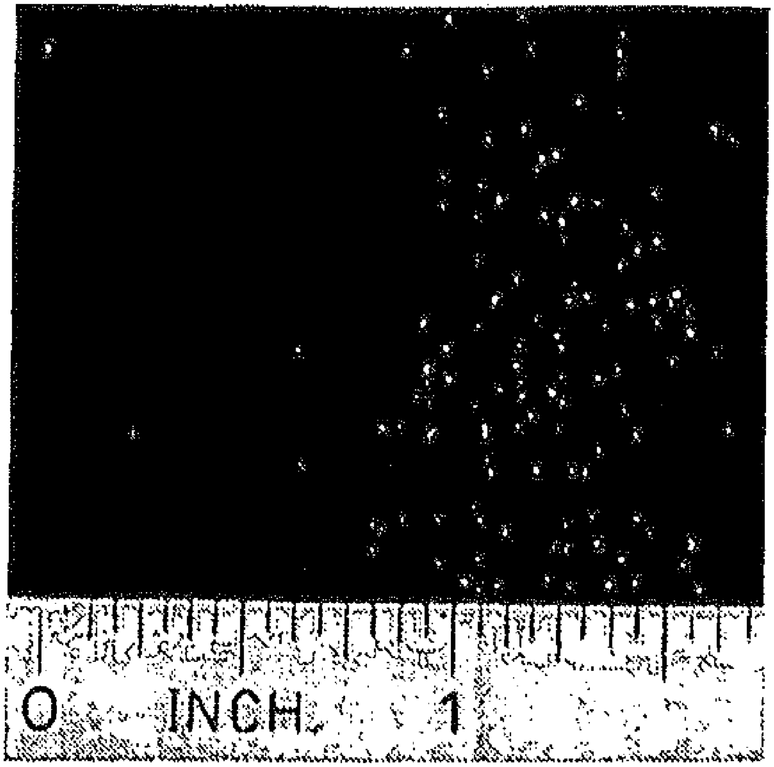
FIGS. 12*a-b* illustrate a magnified view of a coating sprayed without using a plasma jet control system and a coating sprayed using a plasma jet control system.
Figure 12B:
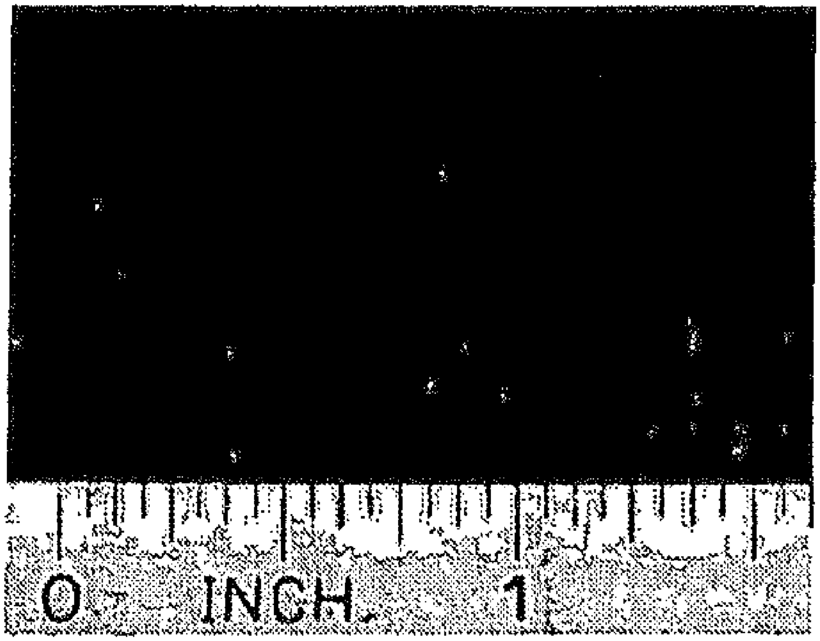

A cascade plasma apparatus consistent with the present disclosure may generate a plasma jet having a high temperature and enthalpy. In some cases, plasma temperature and enthalpy may result in overheating a substrate being spray coated with the plasma apparatus. Overheating of the substrate may produce stress in the coating and/or defects related agglomeration of fine particles, e.g., having a size below about 5-10 micrometers, as well as various other defects. Generally, such defects may be described as "lamps" or "bumps". FIG. 12*a* is a magnified view of a coated substrate having such a defective coating. By contrast, FIG. 12*b* illustrates a surface having fewer defects. The coated surface shown in FIG. 12*b* has a smoother appearance and texture as compared to the coated surface of FIG. 12*a*.

Figure 11C:
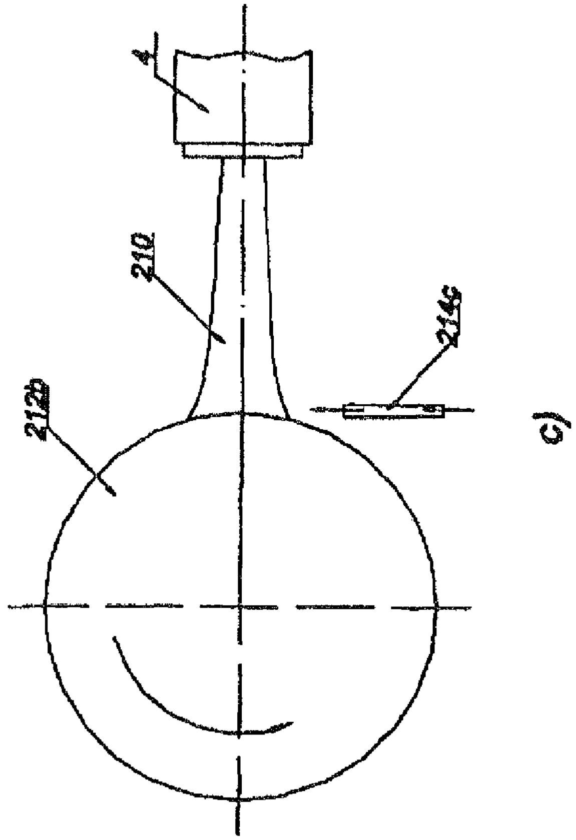
FIGS. 11*a-c* schematically illustrate various aspects of an embodiment of a plasma jet control system consistent with the present disclosure.
Figure 11B:
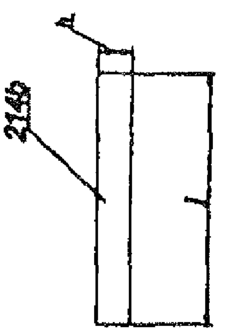
Figure 11A:
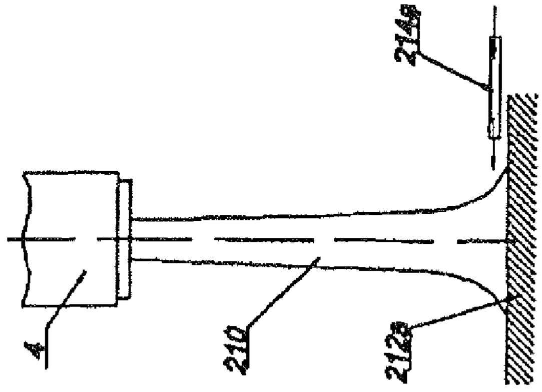

According to one aspect, overheating a substrate, and the resultant increase in defects, may be minimized by employing a deflection gas jet in the region of the coating application. Referring to FIGS. 11*a-c*, a compressed gas deflection jet may be applied across the substrate 212*a* by a deflection gas nozzle 214*a*. The gas nozzle 214*a* may be disposed outside of the spray pattern generated by the plasma apparatus 4 and may be directed generally parallel to the substrate 212*a*, and/or at a slight angle thereto, in the region of the spray pattern. According to one embodiment, the nozzle 214*a* may be positioned just outside of the spray pattern, while in other embodiments the nozzle 214*a* may be located further away from the spray pattern. Different configurations for locating the nozzle 214*a* and 214*c* are illustrated in FIGS. 11*a*, and 11*c*. The deflection gas nozzle 214 may have a generally rectangular profile, as depicted in FIG. 11*b*. The nozzle 214 may be wider than the spray pattern produced by the plasma apparatus 4. For example, the nozzle 214 may have a width in the range of about 30-50 mm for a spray pattern in the order of 25 mm wide. In one embodiment, the height h of the nozzle 214*b* may be in the range of about 2-4 mm. The compressed gas of the deflection jet may be air, nitrogen, etc., and may be supplied at a pressure on the general order of around 3-6 bars. The deflection gas jet may deflect the plasma jet 210 generated by the plasma apparatus 4, along with any fine particles, for example particle having a size less than about 5-10 microns. Larger particle may have sufficient mass, and therefore inertia, to pass through the deflection jet without being substantially deflected.

Those having skill in the art will appreciate that the embodiments described above are susceptible to numerous variations and modifications. Accordingly, the disclosure herein above is intended for the purpose of illustration not limitation.

What is claimed is:

1. A plasma spray coating system comprising:

a cathode module comprising at least one cathode;

an anode module;

a pilot insert under potential during ignition of said plasma spray coating system to provide pilot arcing with said cathode, said pilot insert disposed down-stream of said cathode and between said cathode module and said anode module, said pilot module disposed adjacent said cathode module and having a first channel including an interior cross-sectional diameter opening Dp; and at least one electrically insulated inter-electrode insert disposed between said pilot insert and said anode module, said at least one inter-electrode insert having at least one transverse surface that is angled downstream and having a second channel including an interior cross-section diameter opening Dc, wherein said first and said second channels are axially aligned with said cathode;

wherein $Dp<Dc$ and $0.85>Dp/Dc>0.5$, wherein $Dc-Dp>1.5$ mm; and wherein said pilot insert has a longitudinal length and said length is about 0.5-3.0 of Dc.

2. The plasma spraying system of claim 1, wherein said interior cross-sectional diameter Dp includes a conical converging entrance for gas or plasma flow.

3. The plasma spraying device of claim 2, wherein said conical converging entrance has a longitudinal axis and said converging entrance provides a convergence of said gas or plasma flow at an angle of about 20-40 degrees relative to said longitudinal axis.

4. The plasma spraying system of claim 2, wherein said converging entrance has a longitudinal length and said length is about 10-30% of the total longitudinal length of said pilot insert.

5. The plasma spraying system of claim 1, wherein said pilot insert has an entrance region wherein said entrance region is defined by a curved surface.

6. The plasma spraying system of claim 1, wherein said pilot insert includes one or more bypass openings.

7. The plasma spraying system of claim 5, wherein a plurality of pilot insert bypass openings define a diameter that is greater than Dc and wherein said bypass openings provide a surface area of 0.2-0.8 of $\pi Dp^2/4$.

8. The plasma system of claim 1, further comprising a forming module located downstream of the anode module, wherein said forming module is configured to control the velocity profile of a plasma stream exiting the forming module.

9. The plasma system of claim 8, wherein said forming module is configured to discharge the plasma stream at an angle relative to the plasma channels.

10. The plasma system of claim 1, further comprising a forming module located downstream of the anode module, wherein said forming module is electrically insulated from the anode.

11. The plasma system of claim 1, further comprising a material feeding module including at least one conduit coupled to a powder injector, the material feeding module configured to introduce a powder into said plasma torch.

12. A method for controlling the output pattern of a plasma spray coating, comprising:

supplying a plasma torch comprising at least one cathode, an anode module, one or more inter-electrode inserts located between said cathode module and said anode module, and a pilot insert under potential during ignition of said plasma spray coating system to provide pilot arcing with said cathode, said pilot insert disposed down-stream of said cathode and between said cathode and a first inter-electrode insert, said pilot insert including a first channel in communication with a second channel of said first inter-electrode insert, said first channel having an interior cross-sectional diameter opening Dp, said second gas channel having an interior cross-sectional diameter opening Dc, wherein said first and said second channels are axially aligned with said cathode, said plasma apparatus further comprising a material feeding module including at least one conduit coupled to a powder injector, configured to introduce a powder into said plasma torch;

wherein Dp<Dc, wherein 0.85>Dp/Dc>0.5, Dc−Dp>1.5 mm, and wherein said pilot insert has a longitudinal length and said length is about 0.5-3.0 of Dc;

supplying a gas to said first channel and said second channel; and controlling a flow intensity and flow direction of said gas at said first channel and said second channel.

13. A method in accordance with claim 12 wherein said powder is in a form of powder suspension.

14. A method of claim 12, wherein said gases supplied having a swirl pattern.

15. A method according to claim 12, wherein said plasma torch comprises at least one gas flow channel between said anode module and an adjacent inter-electrode insert.

16. A method according to claim 15, wherein said plasma torch further comprises a control module for controlling said flow intensity and flow direction of said gas.

17. A method in accordance to claim 12, wherein a deflection jet is applied across a substrate to minimize coating defects.

18. A method in accordance to claim 17, wherein said deflection jet is generated by a rectangular gas nozzle.

19. A method in accordance to claim 18, wherein the width of said gas nozzle is wider than said output pattern of a plasma spray coating.

20. A method for manufacturing a plasma spray coating apparatus comprising:

arranging a first inter-electrode insert between a cathode module and an anode module;

arranging a pilot insert down-stream of said cathode module and between said cathode module and said first inter-electrode insert, said pilot insert including a first channel in communication with a second channel of said first inter-electrode insert, wherein said first channel includes an interior cross-sectional diameter opening Dp and said second gas channel includes an interior cross-sectional diameter opening Dc, wherein said first and said second channels are axially aligned with said cathode module;

selecting Dp and Dc such that Dp<Dc and 0.85>Dp/Dc>0.5, and wherein Dc−Dp>1.5 mm; and selecting a longitudinal length of said pilot insert equal to about 0.5-3.0 of Dc.

* * * * *